US012783368B2

(12) United States Patent
Lakshminarayana et al.

(10) Patent No.: US 12,783,368 B2
(45) Date of Patent: Nov. 3, 2026

(54) AUTOMATED FAULT SET CONFIGURATION FOR DISTRIBUTED STORAGE SYSTEMS

(71) Applicant: Dell Products L.P., Round Rock, TX (US)

(72) Inventors: Jayanth Lakshminarayana, Bangalore (IN); Pramod Kumar Puthanveettil Kurungodan, Bengaluru (IN); Peniel Charles, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/003,638

(22) Filed: Dec. 27, 2024

(65) Prior Publication Data

US 2026/0186920 A1 Jul. 2, 2026

(51) Int. Cl.
*G06F 11/00* (2006.01)
*G06F 11/20* (2006.01)

(52) U.S. Cl.
CPC .... *G06F 11/2015* (2013.01); *G06F 2201/805* (2013.01)

(58) Field of Classification Search
CPC ........................ G06F 11/2015; G06F 2201/805
See application file for complete search history.

(56) References Cited

U.S. PATENT DOCUMENTS 8,321,701 B2 * 11/2012 Obr .................... G06F 12/0804 711/143
8,370,652 B2 * 2/2013 Liu ..................... H05K 7/1498 713/323
2005/0229037 A1 * 10/2005 Egan .................. G06F 11/2015 714/14
2008/0317021 A1 * 12/2008 Ives ....................... H04L 41/12 370/389
2015/0363288 A1 * 12/2015 Frick .................... G06F 1/3287 714/6.3

(Continued)

OTHER PUBLICATIONS

Dell Technologies, "Dell PowerFlex," Specification Sheet, Mar. 2024, 16 pages.

(Continued)

*Primary Examiner* — Jason B Bryan
(74) *Attorney, Agent, or Firm* — Ryan, Mason & Lewis, LLP

(57) ABSTRACT

An apparatus comprises at least one processing device configured to identifying nodes of a distributed storage system and power distribution units in an information technology infrastructure environment, and to generate a mapping data structure of mapping identifying power outlets of the power distribution units that the nodes are connected to, where the mappings for a given node are generated by triggering an operation which temporarily reduces power consumption and determining which powers outlets report a change in power consumption in conjunction with the triggered operation. The at least one processing device is also configured to create, based at least in part on the generated mapping data structure, fault sets for the distributed storage system, each of the fault sets comprising a subset of the nodes of the distributed storage system having resiliency to one or more power-related failure conditions.

20 Claims, 11 Drawing Sheets

(56) References Cited

U.S. PATENT DOCUMENTS

| | | | | |
|---|---|---|---|---|
| 2019/0179628 | A1* | 6/2019 | Bulusu .................. | G06F 9/4401 |
| 2024/0192753 | A1* | 6/2024 | Kom ...................... | G03G 15/80 |

OTHER PUBLICATIONS

Dell Technologies, "Dell PowerFlex: Maintenance Modes," White Paper, H18794.3, Aug. 2022, 18 pages.

Dell Technologies, "Dell PowerFlex 4.5.x," Technical Overview, Rev. 1.3, Jul. 2024, 71 pages.

* cited by examiner

300

| NAME (LABEL) | STATUS | CURRENT (AMPS, A) | ACTIVE POWER (WATTS, W) | POWER FACTOR | NON-CRITICAL |
|---|---|---|---|---|---|
| OUTLET 1 | ON | 1.3A | 307W | 0.99 | FALSE |
| OUTLET 2 | ON | 1.3A | 312W | 0.99 | FALSE |
| OUTLET 3 | ON | 1.3A | 310W | 0.99 | FALSE |
| OUTLET 4 | ON | 1.3A | 296W | 0.99 | FALSE |

FIG. 3

500

| POWER SUPPLIES | | | | | | | |
|---|---|---|---|---|---|---|---|
| NAME | STATUS | INPUT WATTAGE | OUTPUT WATTAGE | | FIRMWARE VERSION | PART NUMBER | INPUT LINE TYPE |
| | | | RATED | ACTUAL | | | |
| PS1 STATUS | PRESENCE DETECTED | 1568 | 1400 | 1400 | 00.18.31 | XYZ098 | WIDE RANGE |
| PS2 STATUS | PRESENCE DETECTED | 15680 | 1400 | 1400 | 00.18.31 | XYZ098 | WIDE RANGE |

FIG. 5

600

OUTLET 3

LABEL: 3
NAME:
OUTLET STATUS: ON
RECEPTACLE TYPE: IEC 60320 C13
LINES: L1 – NEUTRAL
OVERCURRENT PROTECTOR: OVERCURRENT PROTECTOR C1
STATE ON DEVICE STARTUP: PDU DEFINED (LAST KNOWN)
POWER OFF PERIOD DURING POWER CYCLE: PDU DEFINED (10s)
NON-CRITICAL OUTLET: FALSE

| **SENSORS** | | |
|---|---|---|
| **TYPE** | **VALUE** | **STATE** |
| RMS CURRENT | 1.3A | NORMAL |
| RMS VOLTAGE | 238V | NORMAL |
| ACTIVE POWER | 310W | NORMAL |
| APPARENT POWER | 313 VA | NORMAL |
| POWER FACTOR | 0.99 | NORMAL |
| … | … | … |

FIG. 6

700

| POWER DISTRIBUTION UNIT (PDU) INFO | OUTLET NUMBERING | POWER CONSUMPTION REPORTED (WATTS, W) | SERVER IDENTIFIER | TIME OF FIRMWARE UPDATE COMPLETE AND WHEN SERVER WAS BROUGHT DOWN MOMENTARILY |
|---|---|---|---|---|
| PDU 10.125.106.252 | 1 | 1500W | | |
| PDU 10.125.106.253 | 1 | 1480W | | |
| PDU 10.125.106.254 | 1 | 1600W | | |
| PDU 10.125.106.255 | 1 | 1500W | | |
| PDU 10.125.106.252 | 2 | 1480W | | |
| PDU 10.125.106.253 | 2 | 1600W | | |
| PDU 10.125.106.254 | 2 | 1480W | | |
| PDU 10.125.106.255 | 2 | 1600W | | |

FIG. 7A

705

| POWER DISTRIBUTION UNIT (PDU) INFO | OUTLET NUMBERING | POWER CONSUMPTION REPORTED (WATTS, W) | SERVER IDENTIFIER | TIME OF FIRMWARE UPDATE COMPLETE AND WHEN SERVER WAS BROUGHT DOWN MOMENTARILY |
|---|---|---|---|---|
| PDU 10.125.106.252 | 1 | 0W | ABCD1234 | 02:10:10 |
| PDU 10.125.106.253 | 1 | 1480W | | |
| PDU 10.125.106.254 | 1 | 0W | ABCD1234 | 02:10:10 |
| PDU 10.125.106.255 | 1 | 1500W | | |
| PDU 10.125.106.252 | 2 | 1480W | | |
| PDU 10.125.106.253 | 2 | 1600W | | |
| PDU 10.125.106.254 | 2 | 1480W | | |
| PDU 10.125.106.255 | 2 | 1600W | | |

FIG. 7B

710

| POWER DISTRIBUTION UNIT (PDU) INFO | OUTLET NUMBERING | POWER CONSUMPTION REPORTED (WATTS, W) | SERVER IDENTIFIER | TIME OF FIRMWARE UPDATE COMPLETE AND WHEN SERVER WAS BROUGHT DOWN MOMENTARILY |
|---|---|---|---|---|
| PDU 10.125.106.252 | 1 | 0W | ABCD1234 | 02:10:10 |
| PDU 10.125.106.253 | 1 | 1480W | EFGH5678 | 02:18:10 |
| PDU 10.125.106.254 | 1 | 0W | ABCD1234 | 02:10:10 |
| PDU 10.125.106.255 | 1 | 1500W | EFGH5678 | 02:18:10 |
| PDU 10.125.106.252 | 2 | 1480W | IJKL9012 | 02:28:10 |
| PDU 10.125.106.253 | 2 | 1600W | MNOP3456 | 02:40:12 |
| PDU 10.125.106.254 | 2 | 1480W | IJKL9012 | 02:28:10 |
| PDU 10.125.106.255 | 2 | 1600W | MNOP3456 | 02:40:12 |

FIG. 7C

AUTOMATED FAULT SET CONFIGURATION FOR DISTRIBUTED STORAGE SYSTEMS

BACKGROUND

Information processing systems may include distributed storage systems comprising a plurality of servers or nodes, where the servers or nodes include storage nodes. Distributed storage systems can provide scalability, performance and resiliency for workloads which are run on the distributed storage systems. A distributed storage system may be implemented utilizing a software-defined infrastructure such as one or more software-defined storage (SDS) solutions.

SUMMARY

Illustrative embodiments of the present disclosure provide techniques for automated fault set configuration for distributed storage systems.

In one embodiment, an apparatus comprises at least one processing device comprising a processor coupled to a memory. The at least one processing device is configured to identify a set of nodes of a distributed storage system deployed in an information technology infrastructure environment, to identify a set of power distribution units in the information technology infrastructure environment, and to monitor power consumption by power outlets of each power distribution unit in the set of power distribution units. The at least one processing device is also configured to generate a mapping data structure comprising mappings identifying ones of the power outlets of the set of power distribution units which each node in the set of nodes of the distributed storage system is connected to, wherein generating the mappings for a given node in the set of nodes of the distributed storage system comprises (i) triggering an operation on the given node which temporarily reduces power consumption of the given node and (ii) determining, based at least in part on the monitored power consumption, which power outlets of the set of power distribution units report at least a threshold change in power consumption in conjunction with the triggered operation on the given node. The at least one processing device is further configured to create, based at least in part on the generated mapping data structure, two or more fault sets for the distributed storage system, each of the created two or more fault sets comprising a subset of the set of nodes of the distributed storage system having resiliency to one or more power-related failure conditions.

These and other illustrative embodiments include, without limitation, methods, apparatus, networks, systems and processor-readable storage media.

BRIEF DESCRIPTION OF THE DRAWINGS

FIG. 3 shows a table of power distribution unit configuration information in an illustrative embodiment.

FIG. 5 shows a table of power supply information for a server or node in an illustrative embodiment.

FIG. 6 shows outlet status information obtained from a power distribution unit in an illustrative embodiment.

FIGS. 7A-7C show population of a power distribution unit mapping data structure in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1A:
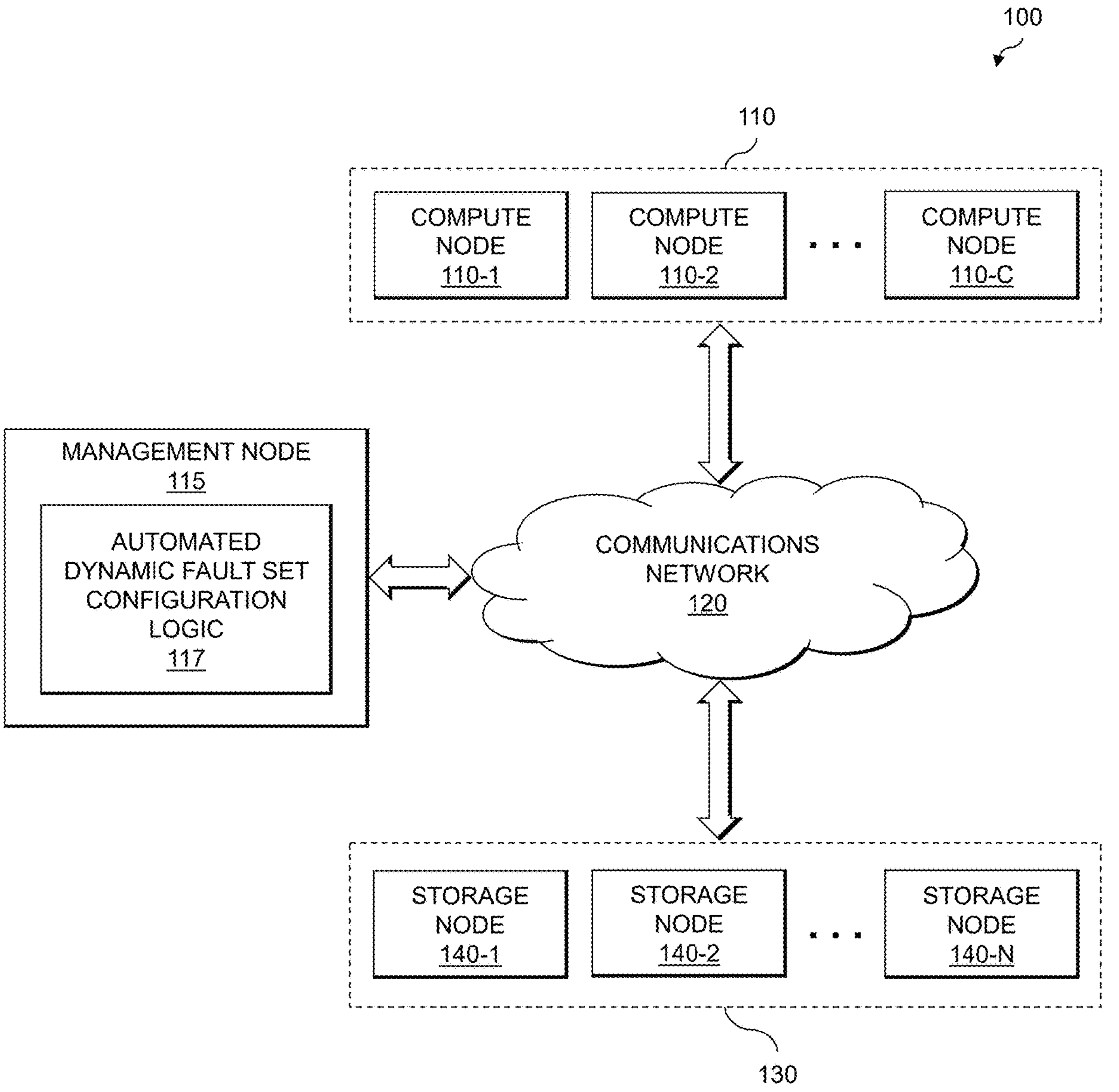
FIGS. 1A and 1B schematically illustrate an information processing system comprising a storage system configured for automated fault set configuration in an illustrative embodiment.
Figure 1B:
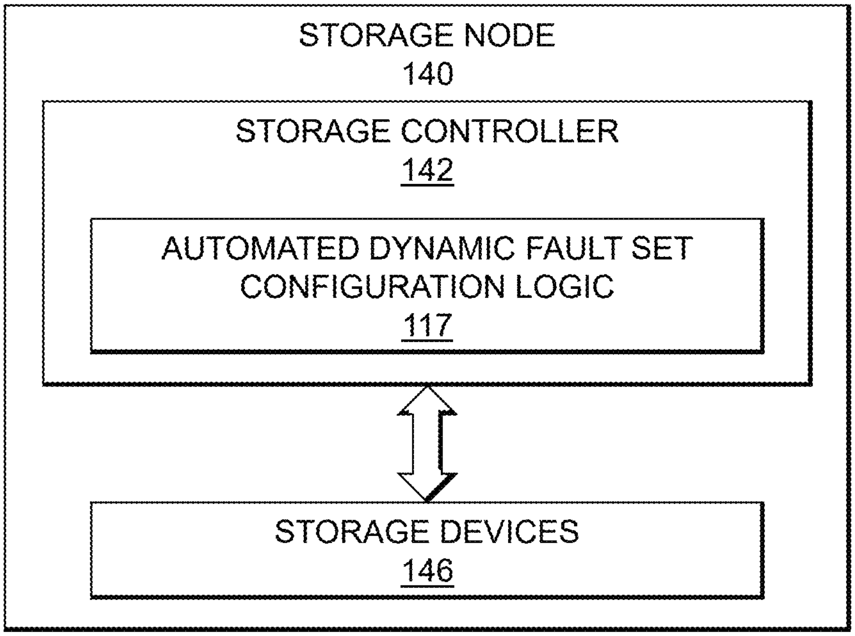

FIGS. 1A and 1B schematically illustrate an information processing system which is configured for automated fault set configuration for distributed storage systems, such as software-defined storage systems or other distributed storage systems comprising multiple nodes (e.g., storage nodes, compute nodes, management nodes, etc.), according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement automated dynamic fault set configuration logic 117 supporting optimization or improvement of fault set configuration in the data storage system 130. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement automated dynamic fault set configuration logic 117 in accordance with the disclosed embodiments, as will be described in further detail below. Various other examples are possible. It is to be noted that the storage controller 142 may include additional modules and other components typically found in conventional implementations of storage controllers and storage systems, although such additional modules and other components are omitted for clarity and simplicity of illustration.

In the embodiment of FIGS. 1A and 1B, the automated dynamic fault set configuration logic 117 may be implemented at least in part within the one or more management nodes 115 as well as in one or more of the storage nodes 140 of the data storage system 130. This may include implementing different portions of the automated dynamic fault set configuration logic 117 functionality described herein within the management nodes 115 and the storage nodes 140. In other embodiments, however, the automated dynamic fault set configuration logic 117 may be implemented entirely within the management nodes 115 or entirely within the storage nodes 140. In still other embodiments, at least a portion of the functionality of the automated dynamic fault set configuration logic 117 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such non-volatile random-access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control IO access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various functions as follows. In particular, a storage virtualization and management services module may implement any suitable logical volume management (LVM) system which is configured to create and manage local storage volumes by aggregating the local storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively “fast” and expensive storage devices and some relatively “slow” and less expensive storage devices. In device tiering, the “fast” devices may be used when performance is the primary requirement, where the “slow” and less expensive devices may be used when capacity is the primary requirement. Such device tiering may also use cloud storage as the “slow” device tier. Some storage systems may also or alternately separate devices offering the same performance level to gain performance isolation between different sets of storage volumes. For example, the storage systems may separate the “fast” devices into different groups to gain performance isolation between storage volumes on such different groups of the “fast” devices.

Illustrative embodiments provide functionality for optimizing or improving the creation of fault sets for the data storage system 130. The automated dynamic fault set configuration logic 117 is configured to identify a set of nodes (e.g., compute nodes 110, management nodes 115, storage nodes 140) of a distributed storage system (e.g., a SDS system) deployed in an IT infrastructure environment (e.g., a data center), and to identify a set of power distribution units (PDUs) in the IT infrastructure environment. The automated dynamic fault set configuration logic 117 is further configured to generate a mapping data structure which maps which power outlets of the identified set of PDUs that each of the nodes of the distributed storage system is connected to. To do so, the automated dynamic fault set configuration logic 117 is configured to trigger operations (e.g., firmware updates, operating system (OS) installation or other operations which involve reboot or restart) on the set of nodes, one at a time. These triggered operations temporarily reduce the power consumption of the nodes (e.g., to zero or near zero power consumption). The automated dynamic fault set configuration logic 117 is configured to monitor power consumption by the power outlets of the PDUs as the operations are triggered on the nodes of the distributed storage system, and determine the power outlets that each node of the distributed storage system is connected to based on which power outlets report a drop in power consumption (e.g., to zero or near zero power consumption) in conjunction with the triggered operations (e.g., during the triggered operations or within some threshold period of time after the triggered operations, the threshold being determined based on an expected time for completion of the triggered operations). The automated dynamic fault set configuration logic 117 is further configured to create, based on the generated mapping data structure, fault sets for the distributed storage system, where the fault sets include different subsets of the nodes of the distributed storage system having resilience to one or more power-related failure conditions (e.g., power-related failure associated with the PDUs that the nodes of the distributed storage system are connected to).

An exemplary process for automated fault set configuration for distributed storage systems will now be described in more detail with reference to the flow diagram of FIG. 2. It is to be understood that this particular process is only an example, and that additional or alternative processes for automated fault set configuration for distributed storage systems may be used in other embodiments.

In this embodiment, the process includes steps 200 through 208. These steps are assumed to be performed using the automated dynamic fault set configuration logic 117, which as noted above may be implemented in the management nodes 115 of system 100, in storage nodes 140 of the data storage system 130 of system 100, in compute nodes 110 of system 100, combinations thereof, etc. The process begins with step 200, identifying a set of nodes of a distributed storage system (e.g., a SDS system) deployed in an IT infrastructure environment. Step 200 may include performing a discovery process to identify the set of nodes based at least in part on out-of-band server management network addresses (e.g., IP addresses) of the set of nodes. In step 202, a set of PDUs in the IT infrastructure environment are identified. Step 202 may include performing a discovery process to identify the set of PDUs based at least in part on management interface network addresses (e.g., IP addresses) of the set of PDUs.

In step 204, power consumption by power outlets of each PDU in the set of PDUs is monitored. A mapping data structure is generated in step 206. The mapping data structure includes mapping identified ones of the power outlets of the set of PDUs which each node in the set of nodes of the distributed storage system is connected to. Generating the mappings for a given node in the set of nodes of the distributed storage system includes (i) triggering an operation on the given node which temporarily reduces power consumption of the given node and (ii) determining, based at least in part on the monitored power consumption, which power outlets of the set of PDUs report at least a threshold change in power consumption in conjunction with the triggered operation on the given node. The triggered operation may comprise a provisioning operation on the given node which involves one or more reboot operations on the given node. The provisioning operation may comprise one of a firmware update operation and an OS installation operation. The triggered operation may alternatively comprise restarting the given node. The given node may include a first power supply (PSU) and a second PSU, where the first PSU of the given node is connected to a first outlet of a first PDU in the set of PDUs, and where the second PSU of the given node is connected to a second outlet of a second PDU in the set of PDUs.

In step 208, two or more fault sets for the distributed storage system are created based at least in part on the generated mapping data structure. Each of the created two or more fault sets comprises a subset of the set of nodes of the distributed storage system having resiliency to one or more power-related failure conditions. The IT infrastructure environment may comprise two or more equipment racks, each of the two or more equipment racks comprising a subset of the set of PDUs. The two or more fault sets created in step 208 may include: a first fault set comprising a first subset of the set of nodes of the distributed storage system which are connected to a first set of power outlets of a first subset of the set of PDUs which are part of a first one of the two or more equipment racks; and a second fault set comprising a second subset of the set of nodes of the distributed storage system which are connected to a second set of power outlets of a second subset of the set of PDUs which are part of a second one of the two or more equipment racks.

Figure 2:
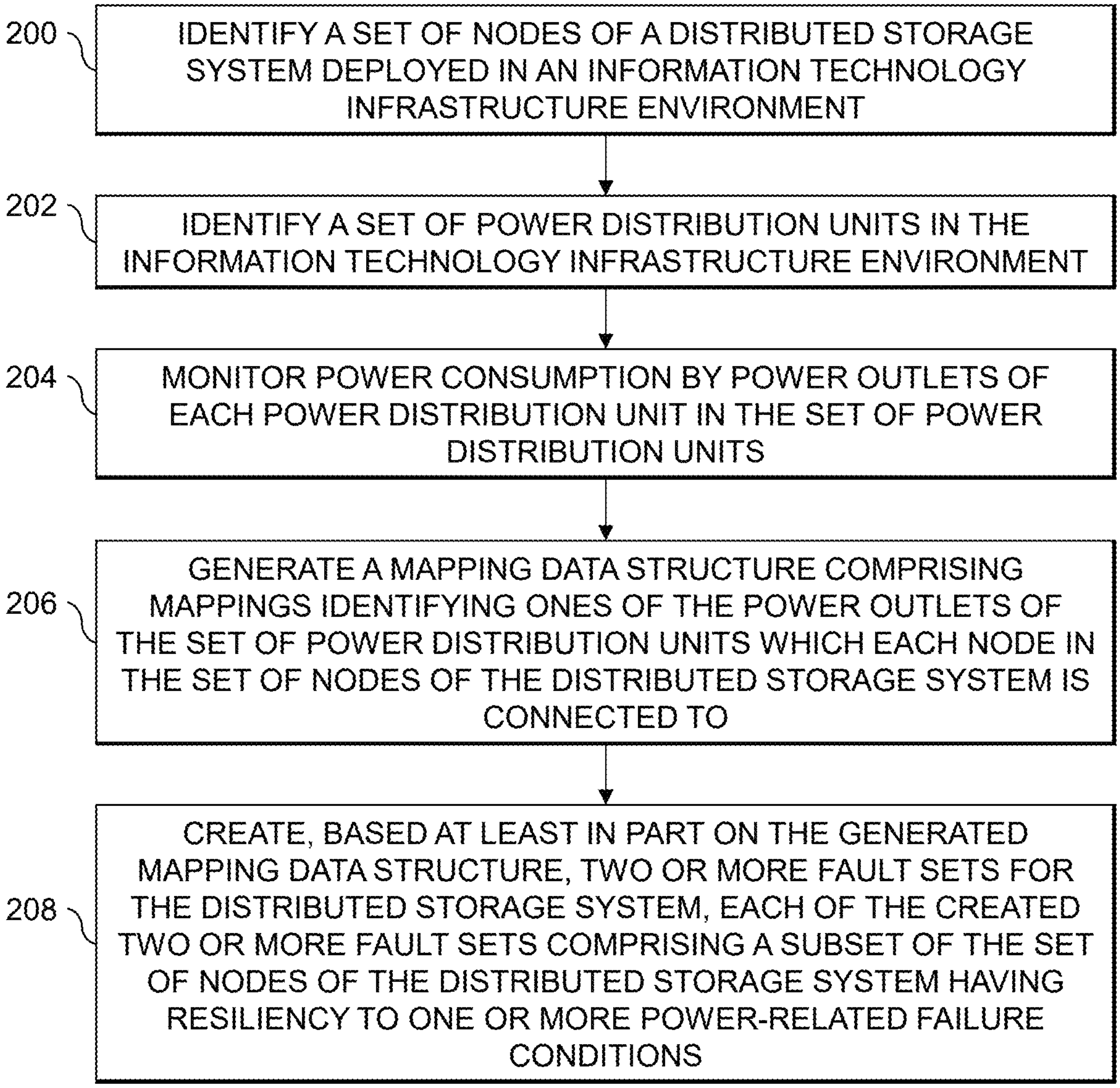
FIG. 2 is a flow diagram of an exemplary process for automated fault set configuration for distributed storage systems in an illustrative embodiment.

In some embodiments, the FIG. 2 process may further include assigning roles of the distributed storage system to ones of the nodes in the set of nodes which are in different ones of the created two or more failure sets. The assigned roles may include, for a SDS system, a primary metadata manager (MDM) role, a secondary MDM role, and a tie-breaker role configured to determine which MDM in the SDS system has the primary MDM role.

The FIG. 2 process may also include updating the generated mapping data structure, such as in response to identifying at least one of addition, removal and replacement of one or more nodes in the set of nodes of the distributed storage system, and/or in response to detecting one or more physical connection changes for one or more of the power outlets of the set of PDUs.

The FIG. 2 process may further include monitoring for the one or more power-related failure conditions and detecting, based at least in part on the monitored power utilization, whether any of the created two or more failure sets is predicted to encounter at least one of the one or more power-related failure conditions within a designated threshold period of time. Responsive to detecting that a given one of the created two or more failures sets is predicted to encounter at least one of the one or more power-related failure conditions within the designated threshold period of time, the FIG. 2 process may include initiating shutdown of a given subset of the set of nodes of the distributed storage system belonging to the given failure set. The at least one of the one or more power-related failure conditions may comprise power utilization, by at least one PDU of the set of PDUs connected to at least one node in the given subset of the set of nodes of the distributed storage system belonging to the given failure set, which exceeds a designated power utilization threshold.

It should be noted that the term "data structure" as used herein is intended to be broadly construed. A data structure, such as the mapping data structure referred to above, may provide a portion of a larger data structure, or the mapping data structure may be a combination of multiple smaller data structures. The mapping data structure and other data structures described herein may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating an existing or previously-created data structure with one or more data items.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

SDS abstracts storage software from hardware, offering flexible and scalable storage management. SDS can centralize management, virtualize storage devices, and provide data services. In some cases, SDS utilizes high-bandwidth, low-latency networks with redundancy for optimal performance and data protection. Fault sets are logical entities that contain a group of SDS resources (e.g., servers or nodes of a SDS system). By grouping SDS resources into a fault set, a storage solution (e.g., Dell PowerFlex) can mirror the data from SDS resources in one fault set to SDS resources in one or more other fault sets. Thus, the use of fault sets will prevent both copies of data from being written to SDS resources in the same fault set. This ensures that one copy of the data is available if an entire fault set fails. The creation of fault sets, however, presents various technical challenges associated with determining how best to organize or group SDS resources such that the SDS resources in different fault sets are less likely to "fail together." Thus, it is useful to determine failure characteristics of the SDS resources, which may be related to various physical components or layers of a SDS system (e.g., SDS resources on the same servers or nodes, which use the same networks, which are connected to the same switches, which are connected to or stacked together in the same equipment rack or other physical location, etc.).

In some cases, data centers are designed such that a unit of failure includes more than a single node. An example use case is where a rack contains several SDS servers or nodes, and a user wants to protect the environment from a situation where the whole rack fails or is lost due to a rack power outage or some disaster. Rack PDUs (rPDUs) are the last link in the power chain of a rack, and ensure delivery of power to IT equipment (e.g., servers, top-of-rack (TOR) switches, etc.) installed in data center racks. The rPDUs are capable of monitoring, managing and controlling power consumption. The rPDUs can be accessed over a local network or remotely. Smart PDUs, including rPDUs, have various capabilities including: enabling communication over Transport Control Protocol (TCP); the ability to bring particular outlets up or down; monitoring power consumption of individual outlets; reporting any power-related anomalies; etc.

SDS systems may be deployed with fault sets enabled in critical production data centers, to prevent mirrored copies of data from being written to SDS resources (e.g., servers or nodes) that are in the same fault set. Manual configuration of fault sets in SDS systems presents various technical challenges, including challenges in identifying the servers or nodes that are stacked together by physical inspection, challenges in identifying the servers or nodes that are stacked together using network configuration information, and challenges in identifying the servers or nodes that are stacked together from PDU configuration information. It should be appreciated that determining which servers or nodes of a SDS system are stacked together may include determining which servers or nodes of a SDS system are installed in a same equipment rack, or which are otherwise placed physically close to one another such that the servers or nodes are connected to the same set of PDUs and are thus likely to “fail together” in the event of power-related issues (e.g., failure of the PDUs, an interruption in power supplied to the PDUs, etc.).

With manual configuration, a user should be aware of the physical layout of servers or nodes, like where the servers or nodes are mounted (e.g., rack details), such that the user can manually identify the servers or nodes which are mounted together. Only then can fault sets be created which avoid single point of failure conditions. Data center administrators may pass on layout details to deployment engineers, and thereafter SDS deployment and configuration may be performed. Such manual procedures for SDS fault set configuration are time-consuming and error-prone. Further, since network topology and IP schema can vary based on user implementation, identifying the servers or nodes which are stacked together using network configuration information is not feasible. Since the outlets of PDUs are manually fed with details, it is also not possible to directly rely on PDU configuration information for the details of servers or nodes which are stacked together. Users might use different naming conventions for servers or nodes and thus, from an orchestration layer, it is not feasible to accurately identify the servers or nodes which are stacked together directly by reading the PDU configuration information. FIG. 3 shows a table 300, illustrating a portion of PDU configuration information for a PDU, including outlet names, status, current, active power, power factor and whether outlets are non-critical. As can be seen, the PDU configuration information in the table 300 does not include mapping information for servers/nodes-PDUs or outlets thereof.

Illustrative embodiments provide technical solutions for automated and dynamic configuration of fault sets. The technical solutions enable dynamic fault set configuration in SDS systems (e.g., Dell PowerFlex) using smart PDUs and controllers (e.g., integrated Dell Remote Access Controllers (iDRACs) or other suitable controllers which may be used in management and orchestration of a SDS system). The technical solutions described herein enable a management and orchestration layer (e.g., PowerFlex Manager) to interact with controllers (e.g., iDRACs) and PDUs (e.g., smart/switched PDUs) to automatically identify a set of servers or nodes which are all mounted on the same rack (or otherwise connected to the same set of PDUs), and to use these details to automatically and dynamically configure fault sets for avoiding single points of failure in the SDS system. The technical solutions described herein utilize the capability of interacting with both iDRACs and PDUs to get more rack-level insight for management and orchestration, which can drive proactive measures through dynamic fault set configuration which reduces the impact of power-related failures.

In some embodiments, the technical solutions configure fault sets automatically in a SDS system by identifying servers or nodes which are stacked together in a single rack. The details used for identifying servers or nodes which are stacked together are not readily available for consumption, and thus some embodiments orchestrate a procedure for creating mappings between each PDU and each server/node, with these mappings being used to achieve dynamic fault set configuration. The technical solutions described herein are further able to detect misconfiguration in the connection of servers or nodes to PDUs (e.g., where a server or node with two power supplies has both of the power supplies connected to outlets of the same PDU, were multiple PDUs are available), and can raise alerts in response to detecting such misconfiguration. The technical solutions described herein are further able to use heterogeneous PDU types.

A process flow for automatic fault set configuration will now be described. A SDS solution or system may implement this process flow (e.g., from a management and orchestration layer). The process flow includes the following steps:

1. Discover hardware entities (e.g., using iDRAC or other controllers). In some embodiments, this includes discovering all servers or nodes (e.g., compute nodes, storage nodes, management nodes) that are part of a SDS system, as well as all PDUs that the servers or nodes of the SDS system are or may connect to. The servers or nodes that are part of the SDS solution may be discovered using their out-of-band (OOB) server management IP addresses. The PDUs may be discovered using their management interface IP addresses.
2. Collect details of each outlet of the PDUs. Here, the outlet details for outlets of the PDUs are collected, along with the power consumption information for the outlets. A database or other data structure, which may be referred to herein as a PDU mapping table or data structure, is created or populated to record the collected outlet information.
3. As part of SDS deployment, bring down each of the discovered servers or nodes of the SDS system one at a time. In some examples, each of the discovered servers or nodes of the SDS solution is brought down momentarily (e.g., after firmware upgrade, after operating system (OS) installation, after a restart or reboot operation which may be triggered for the purpose of populating a PDU mapping table, etc.).
4. Connect to the discovered PDUs and identify the corresponding outlets of the PDUs which report nearly zero power consumption around the same time frame when each of the discovered servers or nodes are brought down.
5. Update the PDU mapping table with mapping information that associates each of the servers or nodes of the SDS system with ones of the outlets of the PDUs to which power supplies (PSUs) of those servers or nodes are connected to. In some embodiments, this includes using service tags or other identifiers for the servers or nodes of the SDS system, where the identifier for the server or node which was brought down in a particular time frame is updated against the PDU outlets which reported zero or near zero power consumption during that time frame (e.g., corresponding to downtime of one of the servers or nodes).
6. Repeat the above steps for all servers or nodes participating in the SDS system. The final updated PDU mapping table will include mapping information for all of the servers or nodes of the SDS system (e.g., indicating which outlets of the PDUs that PSUs of the servers or nodes of the SDS system are connected to).
7. Determine the connections between the servers or nodes of the SDS system and the PDUs utilizing the PDU mapping table. Servers or nodes which are mapped against the same PDU (e.g., different outlets of the same PDU) are determined to be stacked together in the same equipment rack (or otherwise located in close physical proximity to one another, in the case where equipment racks are not used). Such information is used or applied when creating fault sets, so as to group servers or nodes that may fail together (e.g., due to power-related issues) within the same failure domain. This avoids single points of failure in a scale-out infrastructure. Moreover, various roles within a SDS system (e.g., metadata manager, primary nodes of clusters, etc.) can also be distributed across racks, thereby reducing the chance of a single point of failure for such roles.

In some embodiments, orchestration (e.g., using the above processing flow) may be triggered in response to various conditions, such as the addition of new hardware entities (e.g., servers or nodes of the SDS system, PDUs and/or racks in a data center or other IT infrastructure in which the SDS system is deployed, etc.), the replacement of failed hardware entities (e.g., servers or nodes of the SDS solution, PDUs and/or racks, etc.), physical power outlet connection changes (e.g., swapping outlets), etc.

Figure 4:
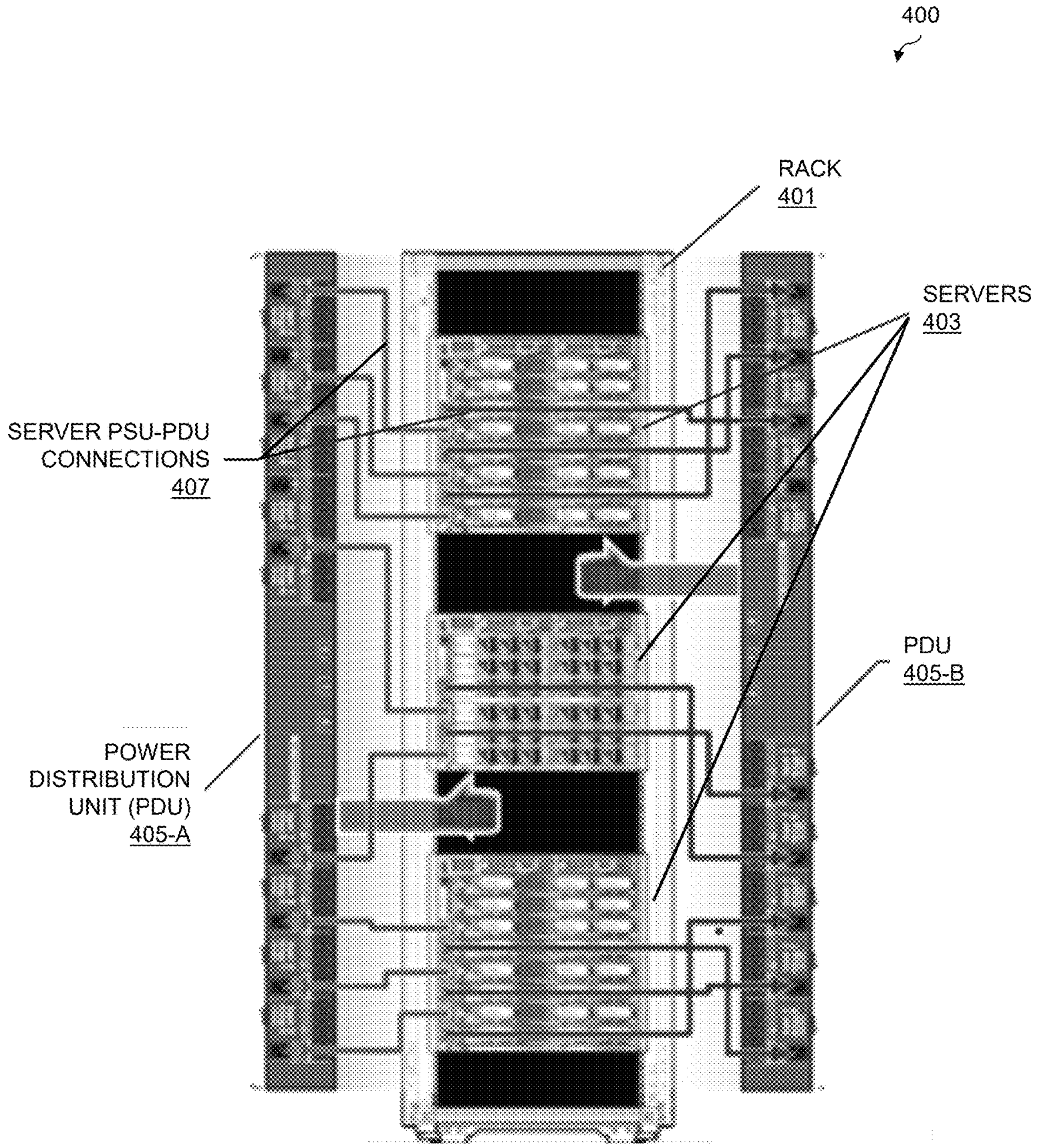
FIG. 4 shows a system including an equipment rack in which servers having multiple power supplies are connected to outlets of different power distribution units in an illustrative embodiment.

An example implementation will now be described with respect to equipment racks that are configured with multiple PDUs. FIG. 4 shows a system 400, including a rack 401 in which servers 403 are installed. The rack 401 in this example includes two PDUs—PDU 405-A and PDU 405-B (collectively, PDUs 405). In this example, each of the servers 403 has two PSUs, with one PSU being connected to the PDU 405-A and the other PSU being connected to the PDU 405-B, shown in FIG. 4 for a single one of the servers 403 as the server PSU-PDU connections 407. FIG. 5 shows a table 500 of power supply information which may be collected from a controller (e.g., an iDRAC) of the servers 403 in the system 400. The table 500 shows the name, status, input wattage, output wattage (rated and actual), firmware version, part number and input line type for each of the PSUs of a given one of the servers 403. FIG. 6 shows PDU-reported configuration information 600 for an outlet (e.g., outlet 3) of one of the PDUs 405 in the system 400. This includes information such as the outlet label, name, status, receptable type, lines, overcurrent protector, state on device startup, power off period during power cycle, whether the outlet is non-critical, and a table of sensor information reported for that outlet including current, voltage, active power, apparent power and power factor values along with indications of whether such values are in a normal or abnormal state. The PDU-reported configuration information may indicate that some piece of hardware (e.g., one of the servers 403) is connected to a particular outlet (e.g., of one of the PDUs 405) along with the power consumption of that outlet, but lacks details as to the specific server or node of an SDS system that is actually connected to each outlet.

An example implementation of automated dynamic fault set configuration will now be described, for an equipment rack (e.g., rack 401 in the system 400) that is configured with more than one PDU (e.g., PDU 405-A and PDU 405-B of the rack 401). Racks in a production data center may be configured with multiple PDUs. For a SDS solution (e.g., Dell PowerFlex), the automated dynamic fault set configuration will begin with discovering the PDUs that are part of the SDS system (e.g., as part of Dell PowerFlex initial inventory discovery). It is assumed in this example that the racks in the production center are configured with more than one PDU, and all PDUs will need to be discovered as part of the initial inventory discovery. Next, a PDU mapping table is populated. PDUs are uniquely identified with their management IP address, and accordingly a single PDU mapping table may be populated for all the PDUs and their respective outlets. FIG. 7A shows a PDU mapping table 700 which is populated after the initial inventory discovery, for four different PDUs having management IP addresses 10.125.106.252, 10.125.106.253, 10.125.106.254 and 10.125.106.255. In this example, each of the PDUs has two outlets (numbered as outlet 1 and outlet 2). The PDU mapping table 700 includes columns for the PDU information (e.g., PDU identifier, such as the PDU's management IP address), outlet numbers or other outlet identifiers, reported power consumption, server identifiers, and the down time (e.g., the time that a firmware update or OS installation is complete, or another operation is triggered which results in the identified server being restarted, rebooted or otherwise brought down momentarily). The initial population of the PDU mapping table 700 may just capture each outlet of each PDU and its power consumption.

During service deployment, the servers or nodes that are part of the SDS system are brought down momentarily after certain operations (e.g., firmware upgrade, installation of an OS, other triggered restart or reboot operations, etc.). Using the PDU interface, the PDU outlets which show a drop in power consumption (e.g., to zero or nearly zero) are mapped to the servers or nodes of the SDS system which are brought down momentarily (e.g., after the firmware upgrade, OS installation or other triggered operation that results in restarting or rebooting the physical servers or nodes of the SDS system). When a given server or node is powered down, PDU outlets that report zero or near-zero power consumption confirm that the PSUs of the given server or node are connected to those specific outlets. FIG. 7B shows an updated PDU mapping table 705, which illustrates population of the server identifier and down time fields for two of the rows of the PDU mapping table 700. In this example, a server with the identifier "ABCD1234" was brought down momentarily at time 02:10:10 (which illustrates the time in an hour, minutes, seconds or HH:MM:SS format, though in other examples other time formats may be used including a format which shows the date and time). The PSUs of the server ABCD1234 were connected to two outlets on two different PDUs (e.g., PDU 10.125.106.252, outlet 1 and PDU 10.125.106.254, outlet 1). This is determined from the outlets of the PDUs which reported zero or nearly-zero power consumption during the down time (e.g., 02:10:10).

To accurately map servers or nodes to outlets of the PDUs, the servers or nodes of the SDS system are brought down one-by-one. The process is repeated for all the servers or nodes that are part of the SDS system (e.g., a Dell PowerFlex service deployment) to populate the remainder of the PDU mapping table, which is shown as the updated PDU mapping table 710 in FIG. 7C. Servers or nodes which are connected to the same PDU indicate that those servers or nodes are stacked together. In this example, the servers ABCD1234 and IJKL9012 are connected to the same set of PDUs, which is used to infer that these servers are stacked together in the same rack. The servers or nodes which are stacked together in the same rack may be made part of one fault set, thereby ensuring that there is no single point of failure.

It should be noted that the technical solutions described herein for automated dynamic fault set configuration may be used in a wide variety of use cases and are not limited to being performed solely during an initial discovery or setup of a SDS system. For example, the automated dynamic fault set configuration process may be utilized during server or node expansion in a SDS system, during server or node replacement in a SDS system, etc. Where a user already has a SDS system deployed (e.g., Dell PowerFlex or any other SDS system or cluster of nodes/servers), it may be desired or necessary to add more racks for expansion. The technical solutions described herein may be utilized in such scenarios to configure fault sets based on the new servers or nodes which are added or replaced (e.g., to avoid a single point of failure). This may include modifying or updating existing fault sets, creating one or more new fault sets, etc.

Another use case example for the technical solutions described herein is in determining and assigning cluster roles. Since awareness of the rack can be achieved using the technical solutions described herein, this enables "rack-aware" assignment of cluster roles, such as primary meta-data manager (MDM), secondary MDM, tiebreaker, etc. across racks. For example, the primary MDM can run on rack 1, while the secondary MDM can run on rack 2 and the tiebreaker can run on rack 3.

Yet another use case example for the technical solutions described herein is in consuming the capability of PDUs. Smart PDUs have various features for monitoring and remote management. When power consumption goes beyond some designated PDU threshold (e.g., a certain kilowatt (kW) threshold), the entire rack will get tripped. In these and other situations, with rack awareness available through use of the technical solutions described herein, a manager of the SDS system can monitor the power utilization and gracefully bring down some of its nodes or servers when the power utilization crosses beyond a designated threshold (e.g., which approaches the PDU threshold at which the entire rack will get tripped), to avoid data unavailability (DU) and/or data loss (DL) situations.

The technical solutions described herein advantageously provide for automated and dynamic fault set configuration. The automated and dynamic fault set configuration can ensure an optimal or improved configuration of fault sets for a SDS system having multiple physical servers or nodes which are connected to multiple PDUs. Through determining which outlets of which PDUs each server or node of the SDS system is connected to, the technical solutions are able to automatically infer the physical layout of the data center or other IT infrastructure in which the servers or nodes of the SDS system are deployed (e.g., determining which servers or nodes of the SDS system are connected to the same sets of PDUs, which can be used to infer which servers or nodes are stacked together in the same equipment racks). Such information is used to automated the creation of fault sets for the SDS system. The technical solutions described herein thus provide various technical advantages relative to conventional approaches for fault set configuration, which rely on manual inspection or a data center administrator to provide the physical layout. These manual processes used in conventional approaches suffer from various technical challenges, including that such manual processes are time-consuming and error-prone.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 8:
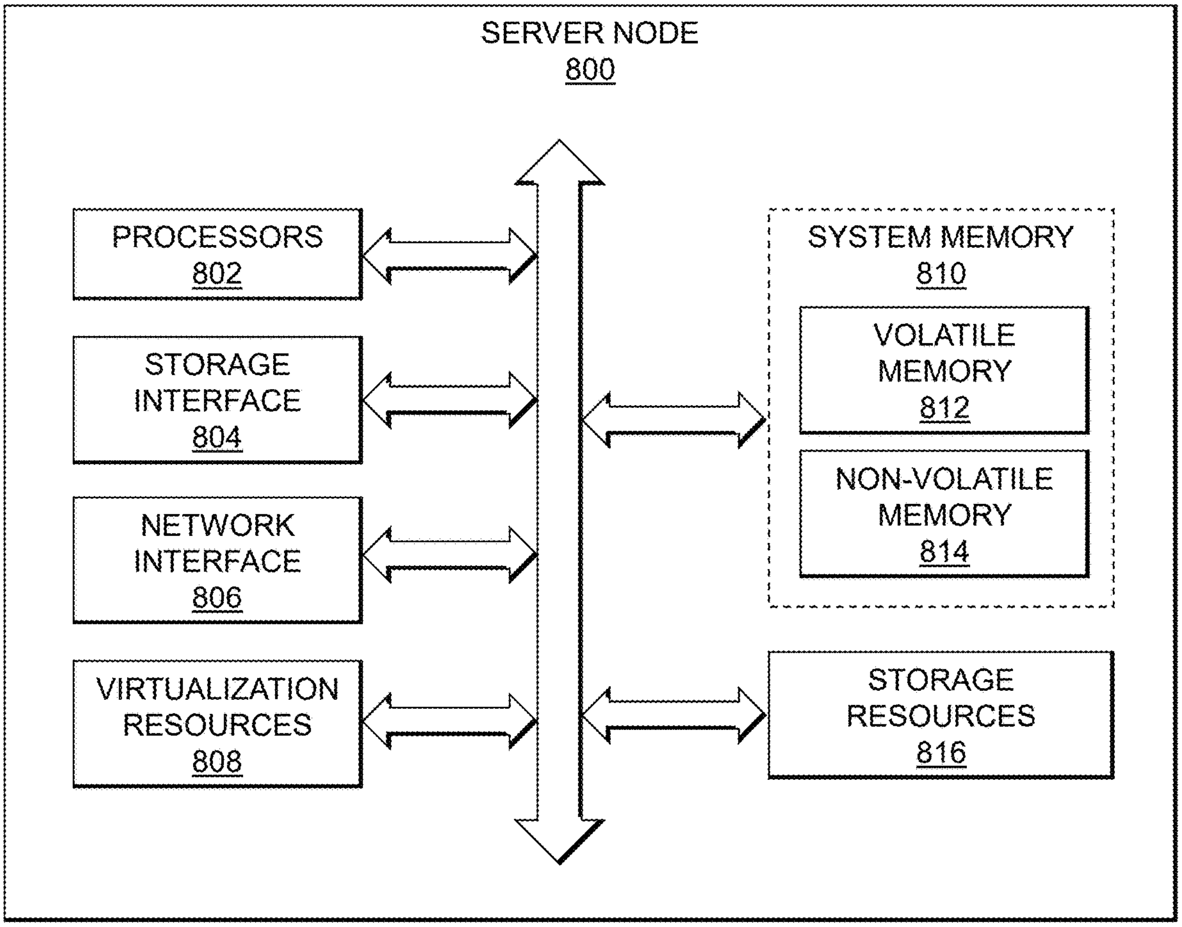
FIG. 8 schematically illustrates a framework of a server node for implementing a storage node which hosts logic for automated fault set configuration in an illustrative embodiment.

FIG. 8 schematically illustrates a framework of a server node (or more generally, a computing node) for hosting logic for automated fault set configuration for software-defined storage systems according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities as discussed herein. In one embodiment, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine.

Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the automated dynamic fault set configuration logic 117, comprise program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile memory 812 is configured as the highest-level memory tier, and the non-volatile memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to identify a set of nodes of a distributed storage system deployed in an information technology infrastructure environment;

to identify a set of power distribution units in the information technology infrastructure environment;

to monitor power consumption by power outlets of each power distribution unit in the set of power distribution units;

to generate a mapping data structure comprising mappings identifying ones of the power outlets of the set of power distribution units which each node in the set of nodes of the distributed storage system is connected to, wherein generating the mappings for a given node in the set of nodes of the distributed storage system comprises (i) triggering an operation on the given node which temporarily reduces power consumption of the given node and (ii) determining, based at least in part on the monitored power consumption, which power outlets of the set of power distribution units report at least a threshold change in power consumption in conjunction with the triggered operation on the given node;

to create, based at least in part on the generated mapping data structure, two or more fault sets for the distributed storage system, each of the created two or more fault sets comprising a subset of the set of nodes of the distributed storage system having resiliency to one or more power-related failure conditions;

to determine, based at least in part on monitored power consumption by the power outlets of each power distribution unit in the set of power distribution units, whether any of the created two or more fault sets is predicted to encounter one or more power-related failure conditions within a designated threshold period of time; and responsive to determining that a given one of the created two or more fault sets is predicted to encounter at least one of the one or more power-related failure conditions within the designated threshold period of time, to initiate one or more actions for at least one node in a given subset of the set of nodes of the distributed storage system which is part of the given one of the created two or more fault sets;

wherein said at least one of the one or more power-related failure conditions comprises power utilization, by at least one power distribution unit of the set of power distribution units connected to said at least one node in the given subset of the set of nodes of the distributed storage system which is part of the given one of the created two or more fault sets, which exceeds a designated power utilization threshold.

2. The apparatus of claim 1 wherein the distributed storage system comprises a software-defined storage system.

3. The apparatus of claim 1 wherein the set of nodes of the distributed storage system comprises one or more compute nodes, one or more storage nodes and one or more management nodes.

4. The apparatus of claim 1 wherein identifying the set of nodes of the distributed storage system comprises performing a discovery process to identify the set of nodes based at least in part on out-of-band server management network addresses of the set of nodes.

5. The apparatus of claim 1 wherein identifying the set of power distribution units comprises performing a discovery process to identify the set of power distribution units based at least in part on management interface network addresses of the set of power distribution units.

6. The apparatus of claim 1 wherein the given node in the set of nodes of the distributed storage system comprises a first power supply and a second power supply, wherein the first power supply of the given node is connected to a first outlet of a first power distribution unit in the set of power distribution units, and wherein the second power supply of the given node is connected to a second outlet of a second power distribution unit in the set of power distribution units.

7. The apparatus of claim 1 wherein the information technology infrastructure environment comprises two or more equipment racks, each of the two or more equipment racks comprising a subset of the set of power distribution units.

8. The apparatus of claim 7 wherein the created two or more fault sets comprise:

a first fault set comprising a first subset of the set of nodes of the distributed storage system which are connected to a first set of power outlets of a first subset of the set of power distribution units which are part of a first one of the two or more equipment racks; and a second fault set comprising a second subset of the set of nodes of the distributed storage system which are connected to a second set of power outlets of a second subset of the set of power distribution units which are part of a second one of the two or more equipment racks.

9. The apparatus of claim 1 wherein the at least one processing device is further configured to assign roles of the distributed storage system to ones of the nodes in the set of nodes which are in different ones of the created two or more fault sets, the assigned roles comprising a primary metadata manager role, a secondary metadata manager role, and a tiebreaker role configured to determine which metadata manager in the distributed storage system has the primary metadata manager role.

10. The apparatus of claim 1 wherein the triggered operation comprises a provisioning operation on the given node which involves one or more reboot operations on the given node.

11. The apparatus of claim 10 wherein the provisioning operation comprises one of a firmware update operation and an operating system installation operation.

12. The apparatus of claim 1 wherein the triggered operation comprises restarting the given node.

13. The apparatus of claim 1 wherein the at least one processing device is further configured to update the generated mapping data structure in response to identifying at least one of addition, removal and replacement of one or more nodes in the set of nodes of the distributed storage system.

14. The apparatus of claim 1 wherein the at least one processing device is further configured to update the generated mapping data structure in response to detecting one or more physical connection changes for one or more of the power outlets of the set of power distribution units.

15. The apparatus of claim 1 wherein initiating the one or more actions for said at least one node in the given subset of the set of nodes of the distributed storage system which is part of the given one of the created two or more fault sets comprises initiating shutdown of said at least one node in the given subset of the set of nodes of the distributed storage system which is part of the given one of the created two or more fault sets.

16. A computer program product comprising a non-transitory processor-readable storage medium having stored therein program code of one or more software programs, wherein the program code when executed by at least one processing device causes the at least one processing device:

to identify a set of nodes of a distributed storage system deployed in an information technology infrastructure environment;

to identify a set of power distribution units in the information technology infrastructure environment;

to monitor power consumption by power outlets of each power distribution unit in the set of power distribution units;

to generate a mapping data structure comprising mappings identifying ones of the power outlets of the set of power distribution units which each node in the set of nodes of the distributed storage system is connected to, wherein generating the mappings for a given node in the set of nodes of the distributed storage system comprises (i) triggering an operation on the given node which temporarily reduces power consumption of the given node and (ii) determining, based at least in part on the monitored power consumption, which power outlets of the set of power distribution units report at least a threshold change in power consumption in conjunction with the triggered operation on the given node;

to create, based at least in part on the generated mapping data structure, two or more fault sets for the distributed storage system, each of the created two or more fault sets comprising a subset of the set of nodes of the distributed storage system having resiliency to one or more power-related failure conditions;

to determine, based at least in part on monitored power consumption by the power outlets of each power distribution unit in the set of power distribution units, whether any of the created two or more fault sets is predicted to encounter one or more power-related failure conditions within a designated threshold period of time; and responsive to determining that a given one of the created two or more fault sets is predicted to encounter at least one of the one or more power-related failure conditions within the designated threshold period of time, to initiate one or more actions for at least one node in a given subset of the set of nodes of the distributed storage system which is part of the given one of the created two or more fault sets;

wherein said at least one of the one or more power-related failure conditions comprises power utilization, by at least one power distribution unit of the set of power distribution units connected to said at least one node in the given subset of the set of nodes of the distributed storage system which is part of the given one of the created two or more fault sets, which exceeds a designated power utilization threshold.

17. The computer program product of claim 16 wherein:

the information technology infrastructure environment comprises two or more equipment racks, each of the two or more equipment racks comprising a subset of the set of power distribution units; and the created two or more fault sets comprise:

a first fault set comprising a first subset of the set of nodes of the distributed storage system which are connected to a first set of power outlets of a first subset of the set of power distribution units which are part of a first one of the two or more equipment racks; and a second fault set comprising a second subset of the set of nodes of the distributed storage system which are connected to a second set of power outlets of a second subset of the set of power distribution units which are part of a second one of the two or more equipment racks.

18. A method comprising:

identifying a set of nodes of a distributed storage system deployed in an information technology infrastructure environment;

identifying a set of power distribution units in the information technology infrastructure environment;

monitoring power consumption by power outlets of each power distribution unit in the set of power distribution units;

generating a mapping data structure comprising mappings identifying ones of the power outlets of the set of power distribution units which each node in the set of nodes of the distributed storage system is connected to, wherein generating the mappings for a given node in the set of nodes of the distributed storage system comprises (i) triggering an operation on the given node which temporarily reduces power consumption of the given node and (ii) determining, based at least in part on the monitored power consumption, which power outlets of the set of power distribution units report at least a threshold change in power consumption in conjunction with the triggered operation on the given node;

creating, based at least in part on the generated mapping data structure, two or more fault sets for the distributed storage system, each of the created two or more fault sets comprising a subset of the set of nodes of the distributed storage system having resiliency to one or more power-related failure conditions;

determining, based at least in part on monitored power consumption by the power outlets of each power distribution unit in the set of power distribution units, whether any of the created two or more fault sets is predicted to encounter one or more power-related failure conditions within a designated threshold period of time; and responsive to determining that a given one of the created two or more fault sets is predicted to encounter at least one of the one or more power-related failure conditions within the designated threshold period of time, initiating one or more actions for at least one node in a given subset of the set of nodes of the distributed storage system which is part of the given one of the created two or more fault sets;

wherein said at least one of the one or more power-related failure conditions comprises power utilization, by at least one power distribution unit of the set of power distribution units connected to said at least one node in the given subset of the set of nodes of the distributed storage system which is part of the given one of the created two or more fault sets, which exceeds a designated power utilization threshold; and wherein the method is performed by at least one processing device comprising a processor coupled to a memory.

19. The method of claim 18 wherein:

the information technology infrastructure environment comprises two or more equipment racks, each of the two or more equipment racks comprising a subset of the set of power distribution units; and the created two or more fault sets comprise:

a first fault set comprising a first subset of the set of nodes of the distributed storage system which are connected to a first set of power outlets of a first subset of the set of power distribution units which are part of a first one of the two or more equipment racks; and a second fault set comprising a second subset of the set of nodes of the distributed storage system which are connected to a second set of power outlets of a second subset of the set of power distribution units which are part of a second one of the two or more equipment racks.

20. The method of claim 18 wherein initiating the one or more actions for said at least one node in the given subset of the set of nodes of the distributed storage system which is part of the given one of the created two or more fault sets comprises initiating shutdown of said at least one node in the given subset of the set of nodes of the distributed storage system which is part of the given one of the created two or more fault sets.

* * * * *